(12) United States Patent
Reed et al.

(10) Patent No.: US 7,407,144 B2
(45) Date of Patent: Aug. 5, 2008

(54) PEDESTALS

(75) Inventors: Petra Reed, Redwood City, CA (US);
James P. Reed, Redwood City, CA (US)

(73) Assignee: Pedestal Designs Inc., Menlo Park, CA (US)

( * ) Notice: Subject to any disclaimer, the term of this patent is extended or adjusted under 35 U.S.C. 154(b) by 484 days.

(21) Appl. No.: 10/734,868

(22) Filed: Dec. 12, 2003

(65) Prior Publication Data

US 2004/0124324 A1 Jul. 1, 2004

Related U.S. Application Data

(63) Continuation-in-part of application No. 10/117,686, filed on Apr. 5, 2002, now Pat. No. 6,688,573, which is a continuation-in-part of application No. 09/905,702, filed on Aug. 2, 2001, now abandoned.

(60) Provisional application No. 60/310,138, filed on Aug. 2, 2001.

(51) Int. Cl.
*A47G 29/00* (2006.01)
(52) U.S. Cl. .................. 248/346.01; 248/678; 108/181
(58) Field of Classification Search ............ 248/346.03, 248/346.01, 678, 188.1; 108/181, 67; 446/85, 446/105, 106, 117, 122, 124, 126; 126/25 B, 126/29; 99/419, 421
See application file for complete search history.

(56) References Cited

U.S. PATENT DOCUMENTS

| 243,567 | A | 6/1881 | Ireland |
| 1,298,762 | A | 4/1919 | Milligan |
| D118,463 | S | 1/1940 | West |
| 3,176,676 | A | 4/1965 | Caldwell ..................... 126/25 |
| D221,781 | S | 9/1971 | Calgan ............................ D6/3 |
| 3,858,495 | A | 1/1975 | Gotwalt .................. 99/421 HH |
| D287,677 | S | 1/1987 | Pomeroy et al. .............. D6/449 |
| 4,760,802 | A | 8/1988 | Leong ......................... 108/157 |
| 5,353,716 | A | 10/1994 | Wilbert ....................... 108/150 |
| 5,425,198 | A | 6/1995 | Coy ............................... 47/18 |
| 5,829,602 | A | 11/1998 | St. John Danko .......... 211/13.1 |
| 5,887,513 | A | 3/1999 | Fielding et al. ........... 99/421 A |
| 5,996,820 | A | 12/1999 | Broadnax ................... 211/85.4 |
| D446,043 | S | 8/2001 | Stoppenhagen et al. ...... D6/396 |
| 6,314,869 | B1 | 11/2001 | Bourgeois, Jr. .............. 99/340 |
| D453,372 | S | 2/2002 | Pecoskie .................... D23/332 |
| 2003/0025060 | A1 | 2/2003 | Reed et al. ................ 248/346.3 |

OTHER PUBLICATIONS

U.S. Appl. No. 09/905,702, filed Aug. 2, 2001, Reed et al.
ALOK Trade Brochure (Pedestal Designs), published before Aug. 2, 2000.

*Primary Examiner*—Amy J. Sterling
*Assistant Examiner*—Steven Marsh
(74) *Attorney, Agent, or Firm*—T. H .P. Richardson

(57) ABSTRACT

A pedestal comprising a pedestal base whose upper surface defines at least two pairs of open channels. Each pair of open channels is sized and spaced so that a support member of constant cross-section can be slidably fitted into the pair of channels. The pairs of channels are positioned so that, when a straight support member is fitted into each pair of channels, all the support members are parallel to each other and form a platform for supporting objects. The pedestals are particularly useful in the catering and hospitality industry for supporting food and beverage containers, tableware, flower vases and sculptures.

16 Claims, 1 Drawing Sheet

PEDESTALS

CROSS-REFERENCE TO RELATED APPLICATIONS

This application is a continuation-in-part of application Ser. No. 10/117,686, filed Apr. 5, 2002, now U.S. Pat. No. 6,688,573. Application Ser. No. 10/117,686 is a continuation-in-part of, and claims priority under 35 U.S.C. 120 from, U.S. application Ser. No. 09/905,702, now abandoned, filed Aug. 2, 2001, which resulted from the conversion under 37 CFR 1.59 (c) (3) of provisional application Ser. No. 60/310,138, filed Aug. 2, 2001, by Petra Reed, into a non-provisional application. The disclosure of each of the above-identified applications is incorporated herein by reference for all purposes.

BACKGROUND OF THE INVENTION

This invention relates to pedestals. The term "pedestal" is used herein to denote a structure which can be placed on the earth, on the floor of a building, or on an elevated surface (for example a buffet or other table, sideboard or desk) and which will support objects (e.g. tableware of all kinds) placed on top of the pedestal. For example, pedestals are widely used in the catering and hospitality industry to support serving dishes, containers, platters, trays, jugs, glasses, bottles, cutlery, ice sculptures and flower vases at positions chosen for functional and/or decorative reasons.

SUMMARY OF THE INVENTION

I have discovered, in accordance with the present invention, new and useful pedestals comprising a pedestal base and a plurality of (i.e. two or more) support members fitted into channels in the upper surface of the pedestal base. In most uses, the pedestal base has a lower surface resting on the floor or on a table or other elevated surface, and an upper surface which, with the support members, can support objects on top of the pedestal. Where reference is made herein to upper, lower, vertical, horizontal etc., those references assume that the pedestal base is being used in this way.

The pedestals of the invention can be easily assembled and disassembled. They can be in the form of kits containing one or more pedestal bases and a plurality of support members which can be assembled with the pedestal base(s) to form the new and useful pedestals of the invention. The components of a kit can be packed into any suitable container, optionally having compartments for different components, for example a fabric bag. A kit comprising a plurality of separate pedestal bases and support members can be assembled into a wide variety of pedestals of different functionalities, shapes, dimensions and decorative appearances. The invention makes it possible for users to transport a kit of relatively small dimensions to, for example, a particular catering or display event, and to construct, on site, one or more pedestals adapted to the particular requirements of the event. After the event, the pedestal(s) can be easily disassembled, cleaned (for example in commercial washing facilities) and repacked as a compact kit for transport to storage or to another event.

This invention provides a pedestal which comprises (1) a pedestal base having an upper surface which defines at least two pairs of open channels, each pair of open channels being sized and spaced so that a straight support member of constant cross section can be slidably fitted into the pair of channels, with a midsection of the support member lying between the open channels and having an open space underneath it, and the pairs of channels being placed on the upper surface so that, when a straight support member is fitted into each pair of channels, the support members are parallel to each other; and (2) at least two support members, each support member being fitted into one of the pairs of channels in the upper surface of the pedestal base, and the support members having top surfaces which lie in a single horizontal plane which is higher than the upper surface of the pedestal base.

the pedestal base comprising two spaced-apart wall members which are connected to each other only by the support members, each wall member having one of the open channels of each pair of channels.

One or more of each pair of channels can optionally have associated therewith at least one additional channel which is sized and spaced so that a support member slidably fitted into the pair of channels can also be slidably fitted into the additional channel(s). The additional channel or channels can be in the same pedestal base or a different pedestal base.

The term "slidably fitted" is used herein to mean that, when the pedestal base is upright, with the open channels exposed, straight support members of constant cross section can be placed in respective pairs of the channels, and are supported by the channels so that the position of each support member can be changed by sliding the support member within the channels. The term "comprises" is used herein in its normal sense in patent law to mean that other components are optionally present.

The wall members can be parallelepipeds, preferably substantially rectangular parallelepipeds.

BRIEF DESCRIPTION OF THE DRAWINGS

The invention is illustrated in the accompanying drawings, in which.

DETAILED DESCRIPTION OF THE INVENTION

Figure 1:
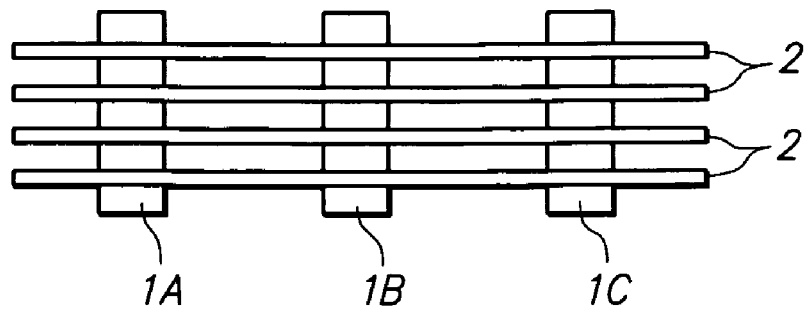
FIGS. 1-3 are top, side and end views of a pedestal of the invention.

In the Summary of the Invention above, in the Detailed Description of the Invention, and the Claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular drawing or a particular claim, that feature can also be used, to the extent possible, in combination with and/or in the context of other particular aspects, embodiments, drawings or claims of the invention, and in the invention generally.

In one embodiment, the pedestal base comprises at least 3 pairs of channels, the number of the support members is equal to the number of pairs of channels; each of the support members is a straight support member slidably fitted into one of the pairs of channels; and the support members have the same cross section.

Pedestal Bases

The pedestal base in the pedestals of the invention comprises two or more spaced-apart wall members, each preferably having the same height, for example a first wall member comprising a plurality of first open channels and a second wall member comprising a plurality of second open channels, each of the first open channels forming, with one of the second open channels, one of the defined pairs of channels.

The pedestal base preferably provides least three pairs, sometimes at least four pairs, for example 5, 6 or 7 pairs, but generally not more than 12 pairs, for example not more than 8 pairs, of open channels. In some embodiments of the invention, the upper surface of the pedestal base provides channels, but the lower surface does not. In other embodiments, both the upper surface and the lower surface include channels. Each pair of open channels is sized and positioned on the upper surface so that a straight support member of constant cross-section can be slidably fitted into the pair of channels. Preferably, all the open channels have cross-sections such that support members of the same cross-section can be slidably fitted into each of them. The pairs of channels are positioned so that when a straight support member is slidably fitted into each pair of channels, all the support members are parallel to each other, and preferably so that the support members are equally spaced from each other.

The two channels making up a pair of channels are often mirror images of each other, and the dimensions of the pairs of channels depend in part on the angular relationship between the surface and the support member.

Often, the upper surface of the pedestal base, except where it is interrupted by the channels, lies in a single, preferably horizontal, plane. Similarly, the lower surface of the pedestal base preferably also lies in a single, preferably horizontal, plane. However, it is also possible for one or both of the surfaces to be irregular, for example to have a repeating waveform. Any irregularity in the upper surface preferably does not cause the upper surface to extend above the upper surface of the support members. Any irregularity in the lower surface preferably does not prevent the lower surface from resting stably on a flat, preferably horizontal, surface. It is possible for one or both of the upper and lower surfaces to lie in a plane which is not horizontal, for example when the pedestal base is to be placed upon a surface of known and regular slope, or when it is desirable for the upper surfaces of the support members to lie in a plane inclined to the horizontal.

In one embodiment, at least 2 pairs of apertures, preferably at least 3 pairs of apertures, for example 5, 6 or 7 pairs of apertures, are sized and placed in the wall of the pedestal base so that additional support members (whose cross-section may be the same as or different from the cross-section of the support members placed in the channels in the upper surface) can be inserted through each pair of apertures to form a platform within the pedestal base. Such a platform can be used, for example, to support a solid fuel heater or an ice tray or bucket, in order to heat or cool a serving dish placed on the support members or on a cap placed on top of the pedestal base in place of the support members; optionally, such a cap is apertured.

Alternatively or additionally, the apertures can serve a decorative purpose.

It is possible for the pedestal base to have open channels in its lower surface as well as its upper surface, in which case the open channels can be such that support members placed in the upper surface are parallel to, or at an angle to, for example a right angle to, support members placed in the lower surface.

Support Members

The pedestals of the invention include at least two support members. The dimensions of the support members and of the channels in the pedestal base into which they fit should be correlated so that straight support members can be slidably fitted into the channels.

The cross-section of the support members and the height of the open channels in the pedestal base are correlated so that the top surfaces of the support members lie in a single horizontal plane which is substantially higher than a horizontal plane containing the upper surface of the pedestal base. For example, the distance between the planes can be 0.3 to 0.7 times the height of the support members. For example, the distance can be such that a second pedestal base, preferably a pedestal base having a channel-containing upper surface identical to the channel-containing upper surface of the first pedestal base) can be placed "upside-down" on top of the support members and can be slid along the support members.

The support members can have any cross-section which enables them to be fitted, preferably slidably fitted, into the open channels. Preferably all the support members have the same cross-section. Preferably the support members have a cross-section having three or more equal sides so that it is not necessary to rotate the member in order to achieve the right orientation for the open channel. It is also preferred, in order to enhance the lateral stability of the support members, once they have been placed in the open channels, that each side of the support member has a vertical section adjacent to a vertical section of the channel, for example a square, hexagonal or octagonal cross-section. A square cross-section is particularly preferred.

Preferably all the support members are straight. However, although, as noted above, the open channels in the pedestal base must be such that they will accept a plurality of straight members, it is not necessary that each, or even any, of the support members is straight throughout its length. It is preferred, however, that each support member comprises straight sections which can be slidably fitted into the open channels. The support members can also include location devices intended to make it easier to achieve desired configurations.

The support members can have any suitable dimensions. When the support member has a square cross-section, each side of the square can for example be 0.25 to 3, or 0.25 to 2, preferably 0.5 to 1.5, in. long. When the support member has a different cross-section, the peripheral length of the cross-section can for example be 0.75 to 12, preferably 2 to 6, in. The length of each support member must be sufficient that it is supported in at least two channels of a pedestal base.

The distance between the adjacent support members should be small enough to ensure that objects likely to be placed on the pedestal will be stably supported by the support members. Thus, this distance is generally not more than 2.5 in., preferably not more than 2.0 in., for example 0.25 to 2.5 in., preferably 1.0 to 2.0 in.

The support members can be a solid and/or hollow. They can also be telescopic.

Pedestals including Two or More Pedestal Bases

The pedestals of the present invention can include two or more pedestal bases as defined. In such pedestals, each support member is preferably slidably fitted into a pair of open channels in each pedestal base. However, unless it is also possible for one or more (including all) of the support members to be slidably fitted into a pair of open channels in one pedestal base and a single open channel in another pedestal base.

Pedestal Bases Including Accessories

The pedestal bases can also be used to support accessories in addition to the support members. For example, apertures in the wall members, or ledges or hooks on the surfaces of the wall members, can be used to support ice trays or sources of heat in order to cool or to heat food placed on the support members. Other useful accessories have (a) lower portions designed to engage, optionally slidably, the upper surface of at least one support member, so that the accessory is supported on top of the support member, or (b) upper portions designed to engage, optionally slidably, at least one support member, so that the accessory hangs below the support member.

Such an accessory can serve to support two or more additional support members which extend at an angle, for example a right angle, to the support members engaged by the accessory.

Materials for the Pedestal Bases and Support Members.

The pedestal bases and support members can be made of any material having properties suitable for the way in which the pedestal is to be used. For general-purpose use, metal is a preferred material. However, it is also possible to use natural or synthetic polymeric materials, or wood, to obtain particular functional or aesthetic results and/or to strike an economic compromise between cost and performance. High melting synthetic polymers, for example polyphenylene sulfides and polyether ether ketones, can be used when a heat resistant pedestal is needed. Other materials that can be used, when their properties are suitable for the way in which the pedestal is to be used, include rigid polyvinyl chloride, polymethyl methacrylate, acrylate resins, liquid crystal polyesters, polycarbonates and cellulosic materials, for example corrugated paper products. Preferably, the material has a matte finish, so that it does not show fingerprints, is resistant to staining by food and beverages, and is resistant to detergents and other materials used in commercial washing systems. We prefer to use aluminum which has been finished so that it has a gray, metallic appearance.

Preferably, the pedestal bases and support members are free of crevices which might trap food or bacteria; for this reason, the presence of screws in the pedestals and support members is preferably avoided.

Figure 2:
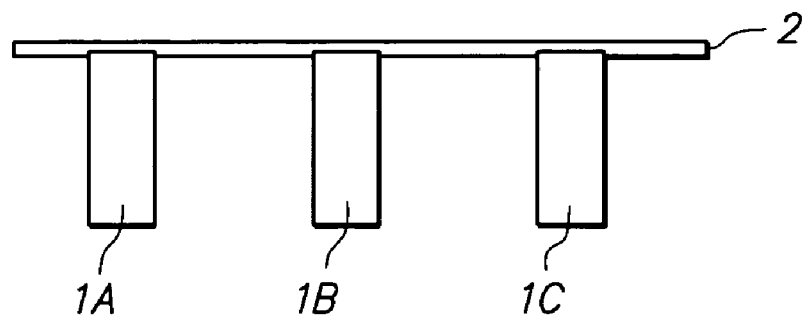
Figure 3:
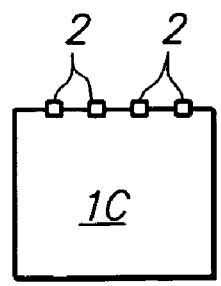

Referring now to the drawings, FIGS. 1-3 show a pedestal of the invention comprising a pedestal base composed of three separate wall members 1A, 1B and 1C, each having four open channels in its upper surface. Four support members 2 are slidably fitted into the open channels.

What is claimed is:

1. A pedestal which comprises
   (1) a pedestal base having an upper surface which defines at least two pairs of open channels, each pair of open channels being sized and spaced so that a straight support member of constant cross section can be slidably fitted into the pair of channels, with a midsection of the support member lying between the open channels and having an open space underneath it, and the pairs of channels being placed on the upper surface so that, when a straight support member is fitted into each pair of channels, the support members are parallel to each other; and
   (2) at least two support members, each support member being fitted into one of the pairs of channels in the upper surface of the pedestal base, and the support members having top surfaces which lie in a single horizontal plane which is higher than the upper surface of the pedestal base;
the pedestal base comprising two spaced-apart wall members which are connected to each other only by the support members, each wall member having one of the open channels of each pair of channels.

2. A pedestal according to claim 1 wherein the pedestal base comprises at least 3 pairs of channels, the number of the support members is equal to the number of pairs of channels; each of the support members is a straight support member slidably fitted into one of the pairs of channels; and all the support members have the same cross section.

3. A pedestal according to claim 2 wherein each of the support members has a square cross-section.

4. A pedestal according to claim 2 wherein each of the support members has a round cross-section.

5. A pedestal according to claim 1 which comprises an upper member having a lower peripheral surface including at least two pairs of open channels which are sized and spaced so that the upper member is slidably fitted on top of the support members.

6. A pedestal according to claim 1 wherein
   (a) each of the support members has a height h,
   (b) the pedestal base has upper surfaces which lie in a horizontal plane, and
   (c) the distance between (i) the horizontal plane in which the upper surfaces of the pedestal base lie and (ii) the horizontal plane in which the top surfaces of the support member lie, is from 0.3 h to 0.7 h.

7. A pedestal according to claim 1 wherein all the support members are straight and the distance between adjacent support members is 0.25 to 2.5 inch.

8. A pedestal which comprises
   (1) a pedestal base having an upper surface which lies in a horizontal plane and which defines at least four pairs of open channels,
   each pair of open channels being sized and spaced so that a straight support member of constant cross section can be slidably fitted into the pair of channels, with a midsection of the support member lying between the open channels and having an open space underneath it, and
   the pairs of channels being placed on the upper surface so that, when a straight support member is fitted into each pair of channels, the support members are parallel to each other and equally spaced from each other; and
   (2) A straight support member slidably fitted into each of the pairs of channels in the upper surface of the pedestal base,
   each of the support members having a height, h, and a constant cross-section having three or more equal sides,
   the support members being substantially identical to each other, the distance between adjacent support members being not more than 2.0 inch,
   the support members having top surfaces which lie in a single horizontal plane which is higher than the upper surface of the pedestal base, and
   the distance between (i) the horizontal plane in which the upper surfaces of the pedestal base lie and (ii) the horizontal plane in which the top surfaces of the support member lie, being from 0.3 h to 0.7 h;
the pedestal base comprising two spaced-apart wall members which are connected to each other only by the support members, each wall member having one of the open channels of each pair of channels.

9. A pedestal according to claim 8 wherein the wall members are substantially identical to each other.

10. A pedestal according to claim 9 wherein each wall member is a substantially rectangular parallelepiped having a top surface comprising one channel of each pair of channels.

11. A pedestal according to claim 8 wherein the upper surface of the pedestal base defines 4 to 8 pairs of open channels.

12. A pedestal according to claim 8 wherein each of the support members has a cross-section which is a square with a side having a length of 0.5 to 1.5 inch.

13. A pedestal according to claim 8 wherein the distance between adjacent support members is 0.25 to 2.5 inch.

14. A pedestal according to claim 8 which comprises an upper member having a lower peripheral surface including at least two pairs of open channels which are sized and spaced so that the upper member is slidably fitted on top of the support members.

15. A pedestal which comprises
   (1) a pedestal base having an upper surface which lies in a horizontal plane and which defines 3 to 8 pairs of open channels,
   each pair of open channels being sized and spaced so that a straight support member of constant cross section can be slidably fitted into the pair of channels, with a midsection of the support member lying between the open channels and having an open space underneath it, and
   the pairs of channels being placed on the upper surface so that, when a straight support member is fitted into each pair of channels, the support members are parallel to each other and equally spaced from each other; and
   (2) a straight support member slidably fitted into each of the pairs of channels in the upper surface of the pedestal base,
   each of the support members having a constant cross-section which is a square with a side having a length, s, of 0.5 to 1.5 inch,
   the support members being substantially identical to each other,
   the distance between adjacent support members being 0.25 to 2.5 inch,
   the support members having top surfaces which lie in a single horizontal plane which is higher than the upper surface of the pedestal base, and
   the distance between (i) the horizontal plane in which the upper surfaces of the pedestal base lie and (ii) the horizontal plane in which the top surfaces of the support member lie, being from 0.3 s to 0.7 s;
   the pedestal base comprising two spaced-apart wall members which are connected to each other only by the support members, the wall members being substantially identical to each other, and each wall member being a substantially rectangular parallelepiped and having a top surface comprising one of the open channels of each pair of channels of each pair of channels.

16. A pedestal according to claim 15 which comprises an upper member having a lower peripheral surface including at least two pairs of open channels which are sized and spaced so that the upper member is slidably fitted on top of the support members.

* * * * *

UNITED STATES PATENT AND TRADEMARK OFFICE
CERTIFICATE OF CORRECTION

PATENT NO.         : 7,407,144 B2                                              Page 1 of 1
APPLICATION NO.  : 10/734868
DATED              : August 5, 2008
INVENTOR(S)        : Petra Reed It is certified that error appears in the above-identified patent and that said Letters Patent is hereby corrected as shown below:

Title page item 12 on the first page of the patent, delete "et al"

Item 75 inventor, delete "James P. Reed"

Signed and Sealed this

Sixteenth Day of December, 2008

JON W. DUDAS
*Director of the United States Patent and Trademark Office*